United States Patent
Altabeb

(10) Patent No.: US 6,916,094 B1
(45) Date of Patent: Jul. 12, 2005

(54) EYEGLASS HOLDER FOR HEADWEAR

(76) Inventor: Rami Altabeb, 151 Uziel Street, Ramat Gan 52302 (IL)

(*) Notice: Subject to any disclaimer, the term of this patent is extended or adjusted under 35 U.S.C. 154(b) by 89 days.

(21) Appl. No.: 10/632,920

(22) Filed: Aug. 4, 2003

(51) Int. Cl.$^7$ ................................................ G02C 3/00
(52) U.S. Cl. ............................................ 351/155; 2/10
(58) Field of Search ................................ 351/155, 158; 2/10, 12, 453, 209.13

(56) References Cited

U.S. PATENT DOCUMENTS

| | | | | |
|---|---|---|---|---|
| 5,261,124 A | * | 11/1993 | Day | 2/10 |
| 5,412,812 A | * | 5/1995 | Gatchalian | 2/10 |
| 5,491,842 A | * | 2/1996 | Braswell-Moore | 2/10 |
| 5,497,211 A | * | 3/1996 | McNulty | 351/52 |
| 5,987,640 A | * | 11/1999 | Ryder | 2/10 |

* cited by examiner

Primary Examiner—Huy Mai
(74) Attorney, Agent, or Firm—David Klein; Dekel Patent Ltd.

(57) ABSTRACT

An eyeglass holder comprising a clip attachable to a visor of a headwear, a fastening element extending from the clip, the fastening element being adapted to fixedly hold a pair of eyeglasses.

3 Claims, 3 Drawing Sheets

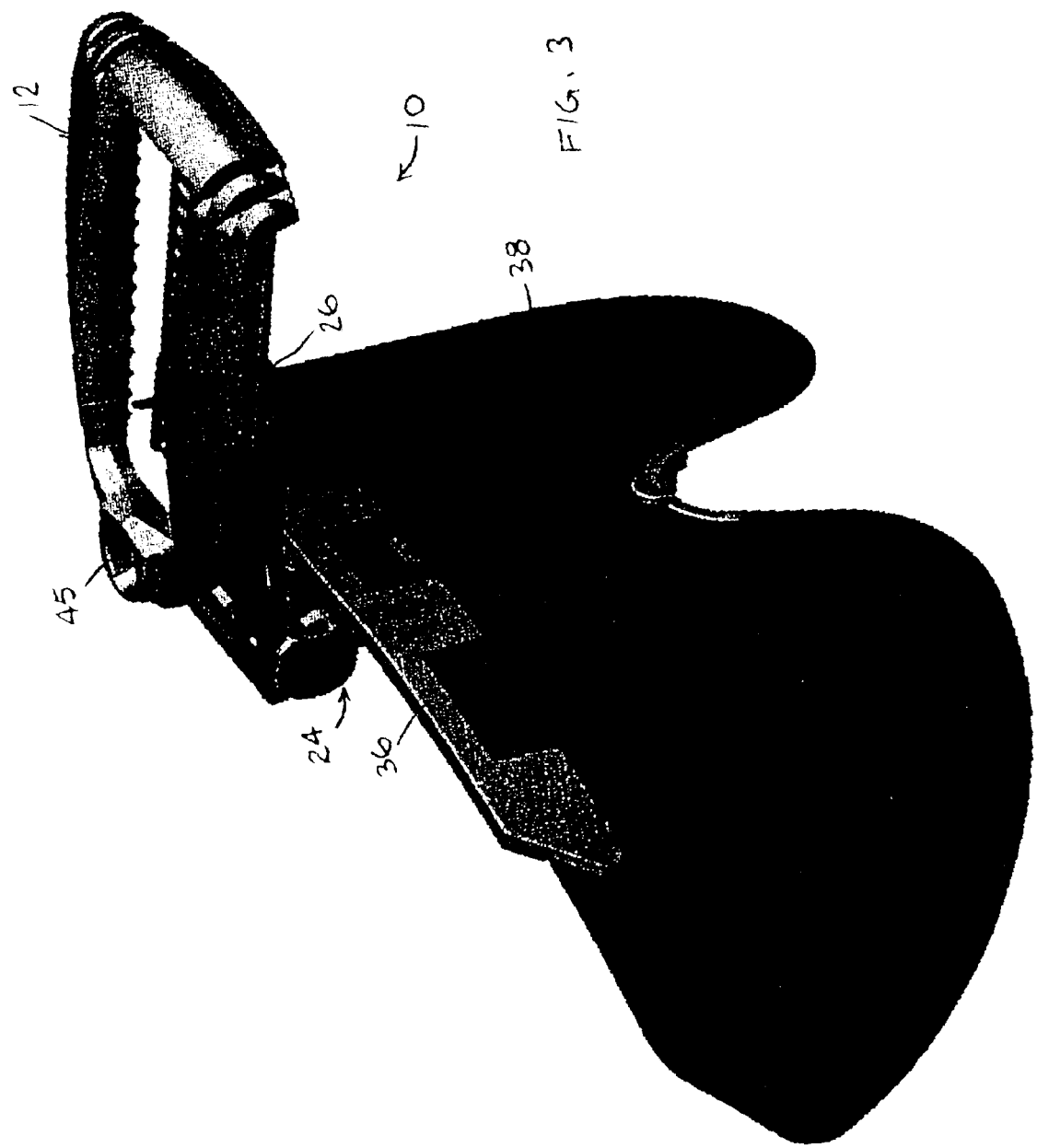

EYEGLASS HOLDER FOR HEADWEAR

FIELD OF THE INVENTION

The present invention relates generally to devices for holding eyeglasses, and particularly to an eyeglass holder attachable to headwear, such as hats or caps.

BACKGROUND OF THE INVENTION

Eyeglass holders that may be attached to a hat or cap are known. U.S. Pat. No. 4,636,048 to Jones describes a frame, which may be worn under a hat with a provision for mounting a pair of eyeglasses such that the eyeglasses do not rest on the bridge of the nose or on the ears. The eyeglasses may be moved in one of three mutually perpendicular directions—up and down, sideways and back and forth with respect to the user's face. The eyeglasses may be pivoted up and down as well.

However, Jones suffers from several disadvantages. The frame attaches to and fits under the head liner of the hat and touches the forehead of the user. The contact of the frame with the user's skin may be uncomfortable, and particularly on hot days, sweaty. The hat must be removed from the user's head in order to adjust or remove the frame. The eyeglasses attach to the frame in a pivotal manner. This may cause the eyeglasses to swivel during use, thereby moving them out of focus. Indeed, the three-dimensional linear adjustments may move during routine walking, and become a nuisance to the user.

SUMMARY OF THE INVENTION

The present invention seeks to provide a novel eyeglass holder for headwear, which overcomes the drawbacks of the prior art.

The eyeglass holder of the present invention may comprise a clip that snugly attaches to the visor of a cap or other headwear. A fastening element may extend from the clip, and may be moved with respect to the clip in a variety of manners, such as in linear or pivoted movement, as is described in detail hereinbelow. The eyeglass holder may further comprise hardware for purposes of identification, advertising, games, amusement, etc. Further advantages include, but are not limited to, fewer parts, thereby substantially reducing manufacturing costs, and very compact design, a particular advantage for storing and carrying.

There is thus provided in accordance with an embodiment of the invention, an eyeglass holder comprising a clip attachable to a visor of a headwear, a fastening element extending from the clip, the fastening element being adapted to fixedly hold a pair of eyeglasses.

In accordance with an embodiment of the invention, the fastening element may be slidable and/or pivotable with respect to the clip, e.g., towards and away from a face of a wearer of the headwear.

Further in accordance with an embodiment of the invention, an intermediate attachment element is slidingly attached to the clip, the fastening element being pivotally attached to the intermediate attachment element.

Still further in accordance with an embodiment of the invention, the fastening element comprises a gripping element adapted to fixedly hold a pair of eyeglasses, the gripping element being slidably mounted on the fastening element. The gripping element may be slidable upwards and downwards with respect to a wearer of the headwear.

In accordance with an embodiment of the invention, the clip comprises friction enhancers for enhancing friction between the clip and a visor of a headwear.

Further in accordance with an embodiment of the invention, a mounting stud may be removably attached to the clip, and a flag may be attached to the mounting stud.

BRIEF DESCRIPTION OF THE DRAWINGS

The present invention will be understood and appreciated more fully from the following detailed description taken in conjunction with the drawings in which:

FIG. 3 is a simplified pictorial illustration showing an eyeglass holder constructed and operative in accordance with another embodiment of the present invention, having a differently shaped gripping element that grips a pair of eyeglasses.

DETAILED DESCRIPTION OF THE PREFERRED EMBODIMENT

Figure 1:
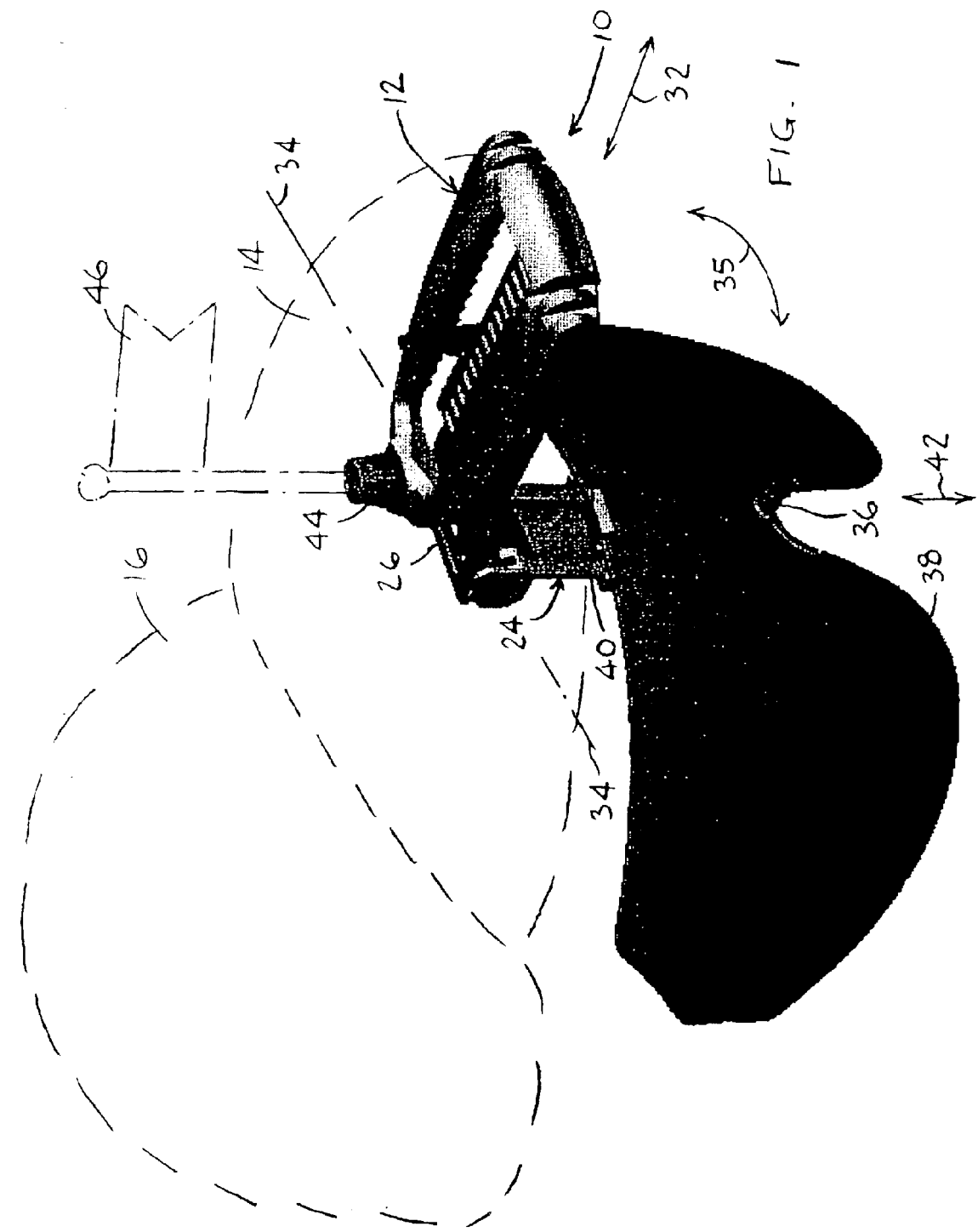
FIG. 1 is a simplified pictorial illustration of an eyeglass holder, constructed and operative in accordance with an embodiment of the present invention, and attached to a visor of headwear.
Figure 2:
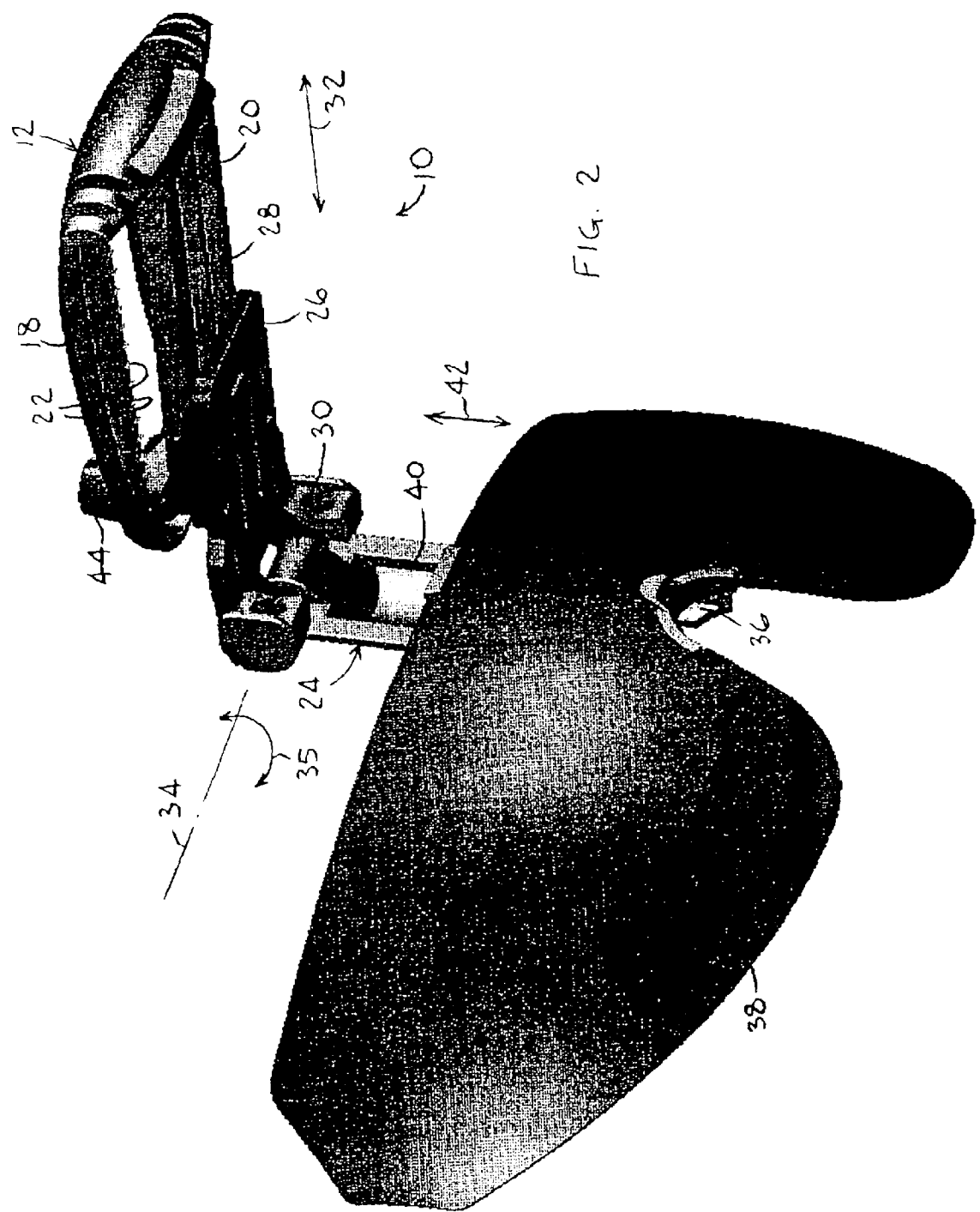
FIG. 2 is a simplified pictorial illustration showing further features of the eyeglass holder of FIG. 1.

Reference is now made to FIGS. 1 and 2, which illustrate an eyeglass holder 10, constructed and operative in accordance with a preferred embodiment of the present invention.

Eyeglass holder 10 may comprise a clip 12 which may be attached to a visor 14 of a headwear 16 (FIG. 1), such as but not limited to, a cap. Clip 12 may be constructed of a pair of flexible and resilient upper and lower tongues 18 and 20, respectively (FIG. 2), which may be molded as a single part. Clip 12 may comprise friction enhancers 22 (FIG. 2), such as but not limited to, teeth or rough protrusions, for enhancing friction between clip 12 and visor 14.

A fastening element 24 may extend from clip 12. Fastening element 24 may be moved with respect to clip 12 in a variety of manners. In the illustrated embodiment, an intermediate attachment element 26 is slidingly attached to clip 12, and fastening element 24 is pivotally attached to intermediate attachment element 26. Intermediate attachment element 26 may slide along a groove, channel or rail 28 formed in lower tongue 20. Fastening element 24 may be pivotably attached to intermediate attachment element 26 by means of a resilient hinge 30. Thus, fastening element 24 may be moved along an axis 32, towards and away from a face of a wearer (not shown) of headwear 16. Fastening element 24 may be pivoted about an axis 34 towards and away from the underside of visor 14, as indicated by arrows 35.

Fastening element 24 may comprise a gripping element 36, which may fixedly hold a pair of eyeglasses 38. Gripping element 36 may grip a central portion of eyeglasses 38, as shown in FIGS. 1 and 2. FIG. 3 shows an alternative construction for gripping element 36, which grips a wider portion of eyeglasses 38. In the embodiment of FIG. 3, gripping element 36 may be used with flexible lenses or flexible eyeglasses, wherein the lens or eyeglass takes on the curvature of the relatively rigid gripping element 36 (that is, gripping element 36 may impart a curvature to a portion of the eyeglass). It is appreciated that many other arbitrary shapes and sizes of gripping element 36 may be constructed within the scope of the invention. Gripping element 36 may be slidably mounted on a groove channel or rail 40 formed in fastening element 24, such that gripping element 36 is slidable upwards and downwards, as indicated by arrows 42.

Eyeglass holder 10 may further comprise hardware for purposes of identification, advertising, games, amusement, etc. For example, a mounting stud 44 may be provided on upper tongue 18 of clip 12. As seen in FIG. 3, mounting stud may be removably attached to clip 12, such as by snapping into a mounting hole 45. A flag 46 (FIG. 1), or other item for identification, advertising, games, amusement, etc., may be attached to mounting stud 44.

It will be appreciated by person skilled in the art that the present invention is not limited by what has been particularly shown and described herein above. Rather the scope of the present invention is defined only by the claims that follow:

What is claimed is:

1. An eyeglass holder comprising:

a clip attachable to a visor of a headwear;

a fastening element extending from said clip, said fastening element being adapted to fixedly hold a pair of eyeglasses, wherein said fastening element comprises a gripping element adapted to fixedly hold a pair of eyeglasses, said gripping element being slidably mounted on said fastening element.

2. The eyeglass holder according to claim 1, wherein said gripping element is slidable upwards and downwards with respect to a wearer of said headwear.

3. The eyeglass holder according to claim 1, wherein said gripping element imparts a curvature to a portion of said eyeglasses.

* * * * *